United States Patent
Hayashi et al.

(10) Patent No.: US 6,537,510 B2
(45) Date of Patent: Mar. 25, 2003

(54) CONDUCTIVE PIGMENT POWDER AND TRANSPARENT CONDUCTIVE FILM FORMED BY USING THE SAME

(75) Inventors: Toshiharu Hayashi, Ohmiya (JP); Hiroshi Yamaguchi, Ohmiya (JP); Daisuke Shibuta, Ohmiya (JP)

(73) Assignee: Mitsubishi Materials Corporation, Tokyo (JP)

(*) Notice: Subject to any disclaimer, the term of this patent is extended or adjusted under 35 U.S.C. 154(b) by 0 days.

(21) Appl. No.: 10/167,661

(22) Filed: Jun. 13, 2002

(65) Prior Publication Data
US 2002/0185632 A1 Dec. 12, 2002

Related U.S. Application Data

(62) Division of application No. 09/727,526, filed on Dec. 4, 2000, now Pat. No. 6,471,889.

(30) Foreign Application Priority Data

| Dec. 2, 1999 | (JP) | 11-342782 |
| Mar. 13, 2000 | (JP) | 2000-068345 |
| Aug. 30, 2000 | (JP) | 2000-260960 |

(51) Int. Cl.$^7$ ............ C01G 7/00; C01G 15/00; C01G 19/02; H01B 1/00; H01L 21/28
(52) U.S. Cl. ............ 423/23; 423/89; 423/111; 423/604; 423/618; 423/624; 252/500; 252/501.1; 252/503; 252/506; 252/512; 252/514; 252/520.1; 438/608; 438/609; 106/31.6; 106/31.92
(58) Field of Search .............. 423/23, 89, 111, 423/604, 618, 624; 252/500, 501.1, 503, 506, 512, 514, 520.1; 438/608, 609; 106/31.6, 31.92

(56) References Cited

U.S. PATENT DOCUMENTS 5,767,931 A * 6/1998 Paczkowski ............... 349/158

FOREIGN PATENT DOCUMENTS

| JP | 6-247716 | 9/1994 | |
| JP | 06247716 | * 9/1994 | C01G/19/00 |
| JP | 8-102227 | 4/1996 | |
| JP | 08102227 | * 4/1996 | H01B/13/00 |

* cited by examiner

Primary Examiner—Mark Kopec
Assistant Examiner—Kallambella Vijayakumar
(74) Attorney, Agent, or Firm—Oblon, Spivak, McClelland, Maier & Neustadt, P.C.

(57) ABSTRACT

One embodiment of the present invention provides a conductive pigment powder, which includes indium oxide, tin and gold, and having a purple color tone. Other embodiments of the present invention provide a method of producing a conductive pigment powder; a dispersion solution and a transparent conductive film, which include the above-mentioned conductive pigment powder; a method of forming a transparent conductive film; and a cathode ray tube, which includes the above-mentioned transparent conductive film and a transparent substrate.

9 Claims, 1 Drawing Sheet

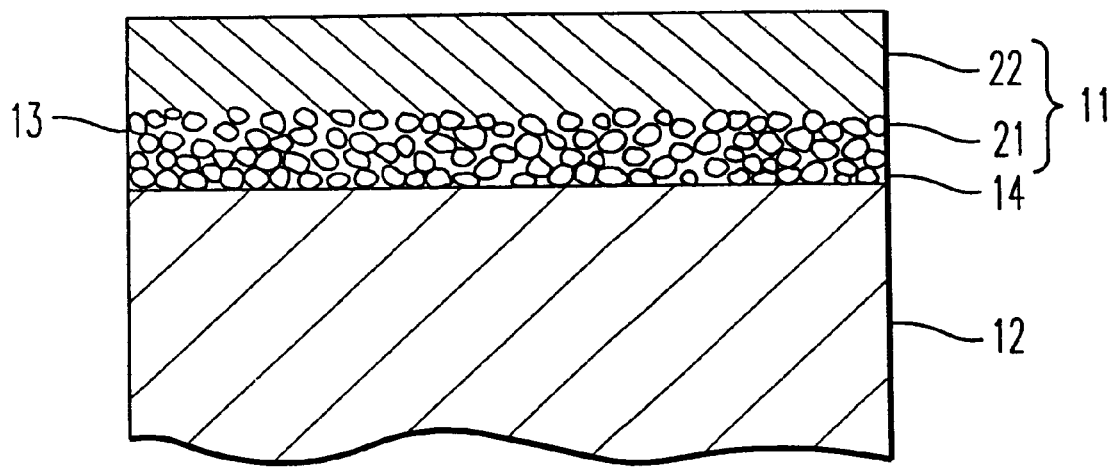

CONDUCTIVE PIGMENT POWDER AND TRANSPARENT CONDUCTIVE FILM FORMED BY USING THE SAME

This application is a Division of application Ser. No. 09/727,526 filed on Dec. 4, 2000, now U.S. Pat. No. 6,471,889.

BACKGROUND OF THE INVENTION

1. Field of the Invention

The present invention relates to a pigment powder having high conductivity and improved color tone, and a transparent conductive film formed on the outer surface of a transparent substrate (face panel) of a cathode ray tube by using the conductive pigment powder and having an anti-reflection function and a leakage electric field preventing function.

2. Discussion of the Background

On the other hand, in cathode ray tubes such as TV Braun tubes and computer CRT, there has recently been concern that leakage of electromagnetic waves from a portion near an electron gun and a deflecting yoke provided therein adversely affects peripheral electronic apparatus and the human body. In order to prevent leakage of electromagnetic waves (electric field), it is necessary to form a conductive film on the outer surface of the face panel of the cathode ray tube to decrease the surface resistance value. When a conductive film includes metal fine particles or a metal compound fine particles and is a thin film, the conductive film generally absorbs visible light. Making the film thicker to decrease the resistance value deteriorates light transmittance, and the luminance of a cathode ray tube deteriorates as a result.

In order to solve this problem, a transparent conductive film has been proposed, which is formed by coating a transparent conductive film forming composition containing a conductive fine powder, a solvent and a non-polymeric film forming agent containing no polymeric binder on a base material, impregnating the coated film on the base material with a solution having viscosity of 25 cps or less and containing a polymeric binder, and then drying or curing the coated film (Japanese Unexamined Patent Publication No. 8-102227). In the transparent conductive film, the conductive fine powder is a fine powder of indium oxide containing tin.

The thus-formed transparent conductive film has a surface resistivity of $1 \times 10^5 \Omega$ or less and haze (the ratio of the diffused transmitted light to direct transmitted light) as low as 1% or less, and thus has a high level of conductivity required for electromagnetic shield, causing no deterioration in luminance of the cathode ray tube. The transparent conductive film also has the property that adhesion to a base material, and film strength are increased.

The present inventors applied for a patent of a low-resistance conductive pigment that contains an indium oxide crystal containing tin, wherein the tin content is 1 to 15 mol % based on the total amount of indium and tin, the surface acidity is $8 \times 10^{-7}$ to $1 \times 10^{-5}$ mol/m$^2$, and the volume resistivity of a 5-MPa green compact measured by a four-probe method is less than $2 \times 10^0$ $\Omega \cdot$cm and not less than $2 \times 10^{-2}$ $\Omega \cdot$cm. (Japanese Unexamined Patent Publication No. 6-247716).

The low-resistance conductive pigment described above is a bluish pigment having lower resistance than a conventional pigment with tin-containing indium oxide, and permits the formation of a transparent conductive film having excellent visibility.

However, the conventional low-resistance conductive pigment disclosed in Japanese Unexamined Patent Publication No. 6-247716 is a bluish conductive pigment and has high volume resistivity, and thus a conductive pigment having an improved purple tone and low volume resistivity is required.

Although dioxazine violet is known as a pigment having a purple tone, this pigment has a problem in that the volume resistivity is as high as about $1 \times 10^{10}$ $\Omega \cdot$cm.

On the other hand, the transparent conductive film disclosed in Japanese Unexamined Patent Publication No. 8-102227 has a defect that it cannot be burned unless the temperature is as relatively high as 400 to 500° C.

The transparent conductive film further has a problem in which the surface resistance value of the transparent conductive film changes with time, i.e., the surface resistivity increases with the passage of time.

There is also a demand for a transparent conductive film which can be burned at a lower temperature and has lower surface resistivity.

SUMMARY OF THE INVENTION

A first object of the present invention is to provide a conductive pigment powder having an improved color tone and a low volume resistivity of 5-MPa green compact.

A second object of the present invention is to provide a conductive pigment powder permitting the formation of a transparent conductive film having excellent visibility.

A third object of the present invention is to provide a transparent conductive film having high adhesion to a transparent substrate (face panel) and film strength, and permitting surface resistivity to be decreased by burning at a relatively low temperature and the prevention of change in the surface resistance with time.

These and other objects have now been attained by the present invention, the first embodiment of which provides a conductive pigment powder, which includes indium oxide, tin and gold, and having a purple color tone.

Another embodiment of the present invention provides a method of producing a conductive pigment powder, which includes:

coprecipitating one or more hydroxides by reacting a mixed aqueous solution that includes an indium salt, a tin salt and a gold salt, with an alkaline aqueous solution, to obtain one or more hydroxides; and heating the hydroxides.

Another embodiment of the present invention provides a dispersion solution, which includes the above-mentioned conductive pigment powder dispersed in one or both of an organic solvent and water, wherein the content of the powder in the solution is 0.01 to 90% by weight.

Another embodiment of the present invention provides a transparent conductive film, which includes the above-mentioned conductive pigment powder.

Another embodiment of the present invention provides a method of forming a transparent conductive film, which includes:

mixing an aqueous solution that includes indium ions, an aqueous solution that includes tin ions, and an aqueous solution that includes gold ions, to form a mixture;

reacting the mixture with an alkaline aqueous solution to form at least one coprecipitated hydroxide;

heating the coprecipitated hydroxide at 350 to 1100° C. to form a conductive pigment powder;

mixing the conductive pigment powder with a solvent that includes one or both of an organic solvent and water, to form a dispersion solution;

coating the dispersion solution on a transparent substrate to form a deposited film; and burning the deposited film at a predetermined temperature to form a transparent conductive film.

Another embodiment of the present invention provides a cathode ray tube, which includes the above-mentioned transparent conductive film and a transparent substrate, wherein the transparent conductive film is formed on an outer surface of the transparent substrate.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIG. 1 is a sectional view of a principal portion of a cathode ray tube including a transparent conductive film in accordance with an embodiment of the present invention. The reference numerals in the figure are described below:

11: transparent conductive film
12: face panel (transparent substrate)
13: conductive pigment powder
14: film matrix
21: first layer
22: second layer.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferred embodiments 1–26 are described below:

In accordance with preferred embodiment 1, a conductive pigment powder of the present invention includes indium oxide containing at least tin and gold, and having a purple tone.

The conductive pigment powder according to preferred embodiment 1 has a purple color tone, and thus has an improved color tone.

In accordance with preferred embodiment 2, the conductive pigment powder of the present invention includes 0.5 to 15 mole % tin and 0.02 to 5 mole % of gold based on the total mole number of indium, tin and gold. These ratios of tin and gold are preferably added to indium oxide to decrease the resistance value and increase conductivity.

In accordance with preferred embodiment 3, the conductive pigment powder of the present invention according to preferred embodiments 1 or 2 has an lightness index L* value of 25 to 85 in a CIE 1976 L*a*b* color space (measurement light source C: color temperature 6774 K), and chromaticness (preferably chromaticity) index a* and b* values of +1.0 to +40.0 and −1.0 to −40.0, respectively.

The conductive pigment powder according to preferred embodiment 3 has the lightness index L* value and the chromaticness index a* and b* values in the above ranges, and a purple color tone.

In accordance with preferred embodiment 4, the conductive pigment powder of the present invention according to any one of preferred embodiments 1 to 3 has a volume resistivity of 0.001 to 100 Ω·cm measured by a four-probe method using a 5-MPa green compact.

The conductive pigment powder according to preferred embodiment 4 can be mixed with a solvent and ink to form a conductive film.

In accordance with preferred embodiment 5, the conductive pigment powder of the present invention according to any one of preferred embodiments 1 to 4 has an average primary particle diameter in the range of 0.005 to 0.5 $\mu$m.

The conductive pigment powder according to preferred embodiment 5 permits the formation of a transparent conductive film having excellent visibility.

In accordance with preferred embodiment 6, a method of producing a conductive pigment powder of the present invention includes the step of obtaining hydroxides by coprecipitation reaction of a mixed aqueous solution including an indium salt, a tin salt and a gold salt, and an alkaline aqueous solution, and the step of heating the hydroxides.

In accordance with preferred embodiments 1 to 5, the conductive pigment powder produced by the method according to preferred embodiment 6 has a purple color tone and thus has an improved color tone. Also, the conductivity is increased to permit the formation of a conductive film by mixing with a solvent and ink, or the formation of a transparent conductive film having excellent visibility.

The heating temperature of the hydroxides is preferably in the range of 350 to 1100° C., and the hydroxides are preferably heated in an inert gas atmosphere containing at least one alcohol gas selected from the group consisting of methanol, ethanol, propanol, and butanol, or an inert gas atmosphere containing at least one gas selected from the group consisting of hydrogen, ammonia, and carbon monoxide. Furthermore, the conductive pigment powder preferably has an average primary particle diameter in the range of 0.005 to 0.2 $\mu$m.

In accordance with preferred embodiment 11, a dispersion solution of the present invention includes the conductive pigment powder according to any one of preferred embodiments 1 to 5, which is dispersed in one or both of an organic solvent and water, wherein the content of the powder is 0.01 to 90% by weight, and the balance is composed of the solvent.

The dispersion solution according to preferred embodiment 11 can be uniformly coated on a transparent substrate, and then burned to obtain a transparent conductive film having high adhesion to the transparent substrate and high film strength.

The organic solvent preferably includes any one of alcohols, ketones, hydrocarbons, amides and sulfoxides.

In accordance with preferred embodiment 13, the present invention relates to an improvement of a transparent conductive film 11 formed on a transparent substrate 12 shown in FIG. 1.

The improvement is characterized by containing a conductive pigment fine powder 13 according to any one of preferred embodiments 1 to 5.

The transparent conductive film according to preferred embodiment 13 is doped with Au as a third element for improving conductivity, and can thus be burned at a relative low temperature, and a change in surface resistivity with time can be prevented.

In accordance with preferred embodiment 14, the invention according to preferred embodiment 13 is characterized in that a film matrix 14 includes an organic polymer.

The transparent conductive film according to preferred embodiment 14 includes the film matrix 14 including an organic polymer, and thus exhibits flexibility when formed on a base material such as a film.

In accordance with preferred embodiment 15, the invention according to preferred embodiment 13 or 14 is characterized in that the film matrix 14 includes at least a siloxane skeleton.

The transparent conductive film according to preferred embodiment 15 includes the film matrix 14 having the siloxane skeleton, and thus has improved hardness, strength, and weather resistance (heat resistance, moisture resistance, chemical resistance, etc.).

In accordance with preferred embodiment 16, the invention according to any one of preferred embodiments 13 to 15 is characterized in that the conductive pigment powder 13 includes indium oxide containing 0.5 to 15 mole % and 0.02 to 5.00 mole % of tin and gold, respectively, based on the total mole number of indium, tin and gold.

The transparent conductive film according to preferred embodiment 16 includes indium oxide containing the above ratios of tin and gold so that the resistance value is increased to improve conductivity.

In accordance with preferred embodiment 17, the invention according to any one of preferred embodiments 13 to 16 is characterized in that the conductive pigment powder 13 has an average primary particle diameter of 0.005 to 0.5 $\mu$m.

The transparent conductive film according to preferred embodiment 17 permits the formation of the transparent conductive film 11 having excellent visibility.

In accordance with preferred embodiment 18, the invention according to any one of preferred embodiments 13 to 17 is characterized in that the volume resistivity of the conductive pigment powder 13 measured by a four-probe method using a 5-MPa green compact is 0.001 to 100 $\Omega \cdot$cm.

The transparent conductive film according to preferred embodiment 18 has improved conductivity and can prevent the occurrence of a leakage electric field.

In accordance with preferred embodiment 19, the invention according to any one of preferred embodiments 13 to 18 is characterized by further including a first layer 21 filled with indium oxide particles containing tin and gold, and a second layer 22 formed by using silica sol on the first layer 21, as shown in FIG. 1.

In accordance with preferred embodiment 20, the invention according to preferred embodiment 19 is characterized by further including a third layer formed by using silica sol on the second layer.

The transparent conductive film according to preferred embodiment 19 or 20 includes the second layer 22 formed on the first layer 21, or the second layer 22 and third layer formed on the first layer 21, thereby preventing scattering of visible light to improve visible light transmittance.

The thickness of each of the first and second layers 21 and 22 is preferably 80 to 110 nm, and the third layer is preferably an uneven layer having a thickness of 2 to 20 nm.

In accordance with preferred embodiment 22, the present invention includes the step of mixing an aqueous solution containing indium ions, an aqueous solution containing tin ions, and an aqueous solution containing gold ions; the step of producing coprecipitated hydroxides by reaction of the mixed aqueous solution and an alkaline aqueous solution; the step of heating the coprecipitated hydroxides at 350 to 1100° C. to form a conductive pigment powder; the step of coating a dispersion solution obtained by mixing the conductive pigment powder in a solvent including one or both of an organic solvent and water on a transparent substrate to deposit a film; and the step of burning the deposited film at a predetermined temperature to form a transparent conductive film.

The method of forming a transparent conductive film according to preferred embodiment 22 is capable of forming the transparent conductive film 11 according to preferred embodiments 13 to 21.

The tin ions are preferably either or both of $Sn^{2+}$ ions and $Sn^{4+}$ ions.

The method preferably further includes the step of heat-treating the conductive pigment powder in the temperature range of 150 to 450° C. in an atmosphere containing at least one gas selected from the group consisting of methanol, ethanol, propanol, and butanol.

In accordance with preferred embodiment 26, a cathode ray tube of the present invention includes the transparent conductive film 11 according to any one of preferred embodiments 13 to 21, which is formed on the outer surface of the transparent substrate 12, as shown in FIG. 1.

The cathode ray tube according to preferred embodiment 26 includes the transparent conductive film 11 having high adhesion to the transparent substrate 12, high film strength and low surface resistivity, thereby obtaining a cathode ray tube having an improved color tone, high conductivity and excellent visibility.

A first embodiment of the present invention will be described.

A conductive pigment powder of the present invention includes indium oxide ($In_2O_3$) containing at least tin (Sn) and gold (Au), and has a purple tone. The pigment powder preferably contains 0.5 to 15 mole %, more preferably 2.0 to 7.5 mole %, of Sn based on the total mole number of In, Sn and Au. The reason for limiting the Sn content to 0.5 to 15 mole % is that with a content of less than 0.5 mole %, conductivity deteriorates, while with a content of over 15 mole %, similarly the conductivity deteriorates, and the L* value in the CIE 1976 L*a*b* color space (measurement light source C: color temperature 6774 K) is less than 25 to produce an excessively dark color as a purple pigment. Also the pigment powder preferably contains 0.02 to 5 mole %, more preferably 0.2 to 1.0 mole %, of Au based on the total mole number of In, Sn and Au. The reason for limiting the Au content to 0.02 to 5 mole % is that with a content of less than 0.02 mole %, conductivity deteriorates and the b* value in the CIE 1976 L*a*b* color space (measurement light source C: color temperature 6774 K) is changed in the + (plus) direction to produce a yellowish color without expressing an intended purple color, while with a content of over 5 mole %, the L* value becomes less than 25 to produce an excessively dark color as a purple pigment.

The pigment powder preferably has a lightness index L* value of 25 to 85, more preferably 30 to 80, in the CIE 1976 L*a*b* color space (measurement light source C: color temperature 6774 K). The reason for limiting the lightness index L* value in the range of 25 to 85 is that with a L* value of less than 25, the color is excessively dark as a purple pigment, while with a L* value of over 85, no defect occurs in the pigment, but such a L* value cannot be actually realized by the production method of the present invention. Also the pigment powder preferably has chromaticness index a* and b* values of +1.0 to +40.0 and −1.0 to −40.0, more preferably +2.5 to +30.0 and −2.5 to −30.0, respectively, in the CIE 1976 L*a*b* color space. The reason for limiting the a* value in the range of +1.0 to +40.0 is that with a* value of less than +1.0, the color is sad, and lacks vividness as a purple pigment, while with a* value of over +40.0, no defect occurs in the pigment, but such an a* value cannot be actually realized by the production method of the present invention. The reason for limiting the b* value in the range of −1.0 to −40.0 is that with b* value of over −1.0, the color is sad, and lacks vividness as a purple pigment, while with b* value of less than −40.0, no defect occurs in the pigment, but such a b* value cannot be actually realized by the production method of the present invention.

The CIE 1976 L*a*b* color space is a color space determined by converting the CIE XYZ color coordinate system by Commission Internationale de I'Eclairage (CIE) in 1976 so that a predetermined distance in the color coordinate system has a perceptually equal rate in any color region. The lightness index L* value, and the chromaticness index a* and b* values represent amounts determined in the rectangular coordinate system in the CIE 1976 L*a*b* color space, and represented by the following equations (1) to (3):

$$L^* = 116(Y/Y_0)^{1/3} - 16 \quad (1)$$

$$a^* = 500\{(X/X_0)^{1/3} - (Y/Y_0)^{1/3+ee}\} \quad (2)$$

$$b^* = 200\{(Y/Y_0)^{+e,\text{fra } 1/3} - (Z/Z_0)^{1/3}\} \quad (3)$$

However, $X/X_0$, $Y/Y_0$, $Z/Z_0 > 0.008856$, X, Y and Z represent the tristimulus values of an object color, and $X_0$, $Y_0$ and $Z_0$ represent the tristimulus values of a light source illuminating the object color, which are normalized on the assumption that $Y_0 = 100$.

On the other hand, the volume resistivity of the pigment powder is preferably 0.001 to 100 Ω·cm, more preferably 0.002 to 50 Ω·cm. The reason for limiting the volume resistivity in the range of 0.001 to 100 Ω·cm is that a resistivity of less than 0.001 Ω·cm cannot be easily realized by a powder mainly including indium oxide, while with a resistivity of over 100 Ω·cm, the powder has no practicability as a conductive pigment. The volume resistivity can be measured by the four-probe method using a green compact of a predetermined size, which is formed by pressing the pigment powder under a pressure of 5-MPa.

The pigment powder preferably has an average primary particle diameter of 0.005 to 0.5 $\mu$m, more preferably 0.01 to 0.2 $\mu$m. The reason for limiting the average primary particle diameter of the pigment powder in the range of 0.005 to 0.5 $\mu$m is that with an average primary particle diameter of less than 0.005 $\mu$m, the conductivity deteriorates, while with an average primary particle diameter of over 0.5 $\mu$m, cloudiness is increased due to light scattering.

The method of producing the conductive pigment powder constructed as described above will be described.

The conductive pigment powder can be obtained by producing hydroxides by coprecipitation reaction of a mixed aqueous solution including an indium salt, a tin salt, and a gold salt, and an alkaline aqueous solution, and then heating the hydroxides. The mixed aqueous solution contains In, Sn and Au ions, i.e., $In^{3+}$ ions, $Sn^{4+}$ or $Sn^{2+}$ ions, and $Au^3$ ions. As supply sources for these ions, not only mineral acid salts or organic acid salts such as hydrochlorides, nitrates, sulfates, acetates, oxalates, and the like, but also other salts and organic coordination compounds may be used. However, chlorides ($InCl_3$, $SnCl_4$, $SnCl_2$, $HAuCl_4$, $AuCl_3$) producing an acid aqueous solution are particularly preferable. In addition, the Sn and Au amounts are controlled to 0.5 to 15 mole % and 0.02 to 5 mole %, respectively, based on the total mole number of In, Sn and Au. On the other hand, the alkaline aqueous solution is not limited, and for example, an alkali metal compound such as NaOH, KOH, $Na_2CO_3$, $K_2CO_3$, $NaHCO_3$, or $KHCO_3$, or an ammonium compound such as $NH_4OH$, $(NH_4)_2CO_3$, or $NH_4HCO_3$ can be used. However, an ammonium compound, particularly $NH_4OH$ ($NH_3$aq) is preferably used.

The mixed aqueous solution is reacted with the alkaline aqueous solution to a hydroxide of ions of each of In, Sn and Au. Namely, indium hydroxide as a precursor hydroxide of the pigment powder, tin hydroxide and gold hydroxide coprecipitate. The reaction temperature is preferably 5 to 90° C., more preferably 10 to 80° C. Although the reaction time depends upon the temperature, the sufficient reaction time is generally 30 to 60 minutes. The coprecipitated hydroxides are filtered off, and if required, sufficiently washed, and then burned directly in the atmosphere, which will be described below, or dried in the air at 100 to 150° C. for 1 to 24 hours.

The coprecipitated hydroxides are burned in the atmosphere, which will be described below, to be converted to oxides by dehydration and crystallized to obtain the pigment powder. The burning temperature is preferably 350 to 1100° C., more preferably 400 to 1000° C. The reason for limiting the burning temperature in the range of 350 to 1100° C. is that with a temperature of less than 350° C., a pigment having a small average primary particle diameter (larger specific surface area) is obtained, but crystallization is not sufficiently performed, while with a temperature of over 1100° C., the particles are significantly grown to increase the average primary particle diameter, thereby making the pigment powder unsuitable for a pigment powder. The burning time is preferably a time sufficient for achieving complete dehydration and crystallization, depending upon the burning temperature. After burning, agglomerated particles are preferably disintegrated by grinding. After burning at 550 to 800° C. (optimum temperature 600 to 750° C.) in the air for 1 to 3 hours, burning is preferably performed at 200 to 450° C. (optimum temperature 275 to 375° C.) in an atmosphere of ethanol gas and nitrogen gas for 0.5 to 3 hours to reduce the burned material.

As the burning atmosphere of the coprecipitated hydroxides, an inert gas atmosphere containing at least one alcohol gas selected from the group consisting of methanol, ethanol, propanol, and butanol, or an inert gas atmosphere containing at least one gas selected from the group consisting of hydrogen, ammonia and carbon monoxide is preferred for reducing the burned material. Particularly, alcohol gas in the heating atmosphere has a reducing function, and is thus more preferable.

FIG. 1 shows a second embodiment of the present invention.

In this embodiment, a transparent conductive film 11 is formed on a transparent substrate 12, and includes a conductive pigment powder 13 of the first embodiment, i.e., the conductive pigment powder 13 including indium oxide ($In_2O_3$) containing at least tin (Sn) and gold (Au). In this embodiment, the transparent substrate 12 is a face panel of a cathode ray tube (Braun tube). In a case where the cathode ray tube is formed in a complete sphere system (the transparent conductive film 11 is formed on the face panel 12 after the funnel of the cathode ray tube and the face panel 12 are welded together), the transparent conductive film 11 is formed on the outer surface of the face panel 12. In a case where the cathode ray tube is formed in a division system (the transparent conductive film 11 is formed on the face panel 12 before the funnel of the cathode ray tube and the face panel 12 are welded together), the transparent conductive film 11 is formed on the inner surface of the face panel 12.

The film matrix 14 of the transparent conductive film 11 includes an organic polymer, an inorganic polymer, an organic-inorganic hybrid polymer such as acryl, polycarbonate, polyester, polyurethane, epoxy, polyalkylsiloxane, polyarylsiloxane, silica, alumina, zirconia, titanium, or the like, or a mixture thereof. The conductive pigment powder 13 preferably contains 0.5 to 15 mole %, more preferably 2.0 to 7.5 mole %, of Sn based on the total mole number of In, Sn and Au. The reason for limiting the Sn content to 0.5 to 15 mole % is that with a Sn content of less than 0.5 mole % or over 15 mole %, the conductivity of the conductive film 11 deteriorates. Also the conductive pigment powder 13 preferably contains 0.02 to 5.00 mole %, more preferably 0.2 to 1.0 mole %, of Au based on the total mole number of In, Sn and Au. The reason for limiting the Au content to 0.02 to 5.00 mole % is that with a Au content of less than 0.02 mole % or over 5.00 mole %, the conductivity of the conductive film 11 deteriorates.

On the other hand, the conductive pigment powder 13 preferably has an average primary particle diameter of 0.005 to 0.5 $\mu$m, more preferably 0.02 to 0.4 $\mu$m. The reason for limiting the average primary particle diameter of the conductive pigment powder in the range of 0.05 to 0.5 $\mu$m is that with an average primary particle diameter of less than 0.005 $\mu$m, the conductivity of the conductive film 11 deteriorates, while with an average primary particle diameter of over 0.5 $\mu$m, transparency is lost. The conductive pigment powder 13 preferably has a volume resistivity of 0.001 to 100 $\Omega$·cm, more preferably 0.02 to 50 $\Omega$·cm. The reason for limiting the volume resistivity in the range of 0.001 to 100 $\Omega$·cm is that with a volume resistivity of less than 0.001 $\Omega$·cm, production of a powder mainly including indium oxide cannot be easily realized, while with a volume resistivity of over 100 $\Omega$·cm, the conductivity of the conductive film 11 deteriorates. The volume resistivity can be measured by the four-probe method using a green compact of a predetermined size, which is formed by pressing the conductive pigment powder 13 under a pressure of 5-MPa.

The conductive film 11 further includes a first layer 21 filled with $In_2O_3$ particles containing Sn and Au, and a second layer 22 formed by using silica sol (organic polymer) on the first layer 21. The thickness of the first layer 21 is preferably 80 to 110 nm, more preferably 85 to 100 nm. The reason for limiting the thickness of the first layer 21 in the range of 80 to 110 nm is that with a thickness of less than 80 nm, the conductivity deteriorates, and the thickness deviates from optical thickness $\lambda/4$ to cause the failure of increasing reflectance, while a thickness of over 110 nm deviates from optical thickness $\lambda/4$ to cause the failure of increasing reflectance. Furthermore, a third layer may be formed by using silica sol on the second layer 22. The third layer is an uneven layer having a thickness of preferably 2 to 20 nm, more preferably 5 to 15 nm. The reason for limiting the thickness of the third layer in the range of 2 to 20 nm is that with a thickness of less than 2 nm, there is no effect of decreasing reflectance, while with a thickness of over 20 nm, the haze is increased to cause the failure of decreasing visibility. The conductive film including the first to third layers have the excellent effect of further increasing film strength and improving visibility, as compared with the conductive film including the first and second layers.

The method of forming the transparent conductive film having the above construction will be described.

(a) Formation of the Conductive Pigment Powder 13 of $In_2O_3$ Containing Sn and Au An aqueous solution containing $In^{3+}$ ions, an aqueous solution containing $Sn^{4+}$ or $Sn^{2+}$ ions, and an aqueous solution containing $Au^{3+}$ ions are first mixed. As supply sources for these ions, chlorides ($InCl_3$, $SnCl_4$, $SnCl_2$, $HAuCl_4$, $AuCl_3$) producing acid aqueous solutions are preferable. In addition, the Sn and Au amounts are controlled to 0.5 to 15 mole % and 0.02 to 5.00 mole %, respectively, based on the total mole number of In, Sn and Au. The mixed aqueous solution is then reacted with an alkaline aqueous solution to produce coprecipitated hydroxides. The alkaline aqueous solution is not limited, and for example, an alkali metal compound such as NaOH, KOH, $Na_2CO_3$, $K_2CO_3$, $NaHCO_3$ or $KHCO_3$, or an ammonium compound such as $NH_4OH$, $(NH_4)_2CO_3$, or $NH_4HCO_3$ can be used. However, an ammonium compound, particularly $NH_4OH$, ($NH_3$aq) is preferably used because the residue of an alkali metal in the conductive pigment powder 13 deteriorates the conductivity. The mixed aqueous solution is reacted with the alkaline aqueous solution to produce a hydroxide of ions of each of In, Sn and Au. Namely, indium hydroxide as a precursor hydroxide of the pigment powder, tin hydroxide and gold hydroxide coprecipitate. The reaction temperature is preferably 5 to 90° C., more preferably 10 to 80° C. Although the reaction time depends upon the temperature, the sufficient reaction time is generally 30 to 60 minutes. The coprecipitated hydroxides are heated at 350 to 1100° C. to produce the conductive pigment powder 13. Namely, the coprecipitated hydroxides are filtered off, and if required, sufficiently washed, and dried in the air at 100 to 150° C. for 1 to 24 hours, followed by burning in the predetermined atmosphere. As a result, the hydroxides are converted into oxides by dehydration and crystallized to obtain the conductive pigment powder 13. The burning temperature is preferably 350 to 1100° C., more preferably 400 to 1000° C. The reason for limiting the burning temperature in the range of 350 to 1100° C. is that with a temperature of less than 350° C., a pigment having a small average primary particle diameter (larger specific surface area) is obtained, but crystallization does not sufficiently proceed, while with a temperature of over 1100° C., the particles are significantly grown to increase the average primary particle diameter, thereby making the pigment powder unsuitable as the conductive pigment powder 13. The burning time is preferably a time sufficient for achieving complete dehydration and crystallization, depending upon the burning temperature. After burning, agglomerated particles are preferably disintegrated by grinding.

After burning at 550 to 800° C. (optimum temperature 600 to 750° C.) in the air for 1 to 3 hours, burning is preferably performed at 200 to 450° C. (optimum temperature 275 to 375° C.) in an atmosphere of ethanol gas and nitrogen gas for 0.5 to 3 hours to reduce the burned material.

As the burning atmosphere, an inert gas atmosphere containing at least one alcohol gas selected from the group consisting of methanol, ethanol, propanol, and butanol, or an inert gas atmosphere containing at least one gas selected from the group consisting of hydrogen, ammonia and carbon monoxide is preferred for reducing the burned material. The inert gas atmosphere may optionally include one or more inert gases such as nitrogen, dry nitrogen, argon, dry argon, and the like. Mixtures are possible.

(b) Formation of the Transparent Conductive Film 11

A dispersion solution obtained by mixing the conductive pigment powder 13 with a solvent is first coated to deposit a film on the transparent substrate 12, and then dried by maintaining at 5 to 80° C. in the air for 1 minute to 1 hour to form the first layer 21. The dispersion solution contains 0.01 to 90% by weight of the conductive pigment powder 13, the balance including the solvent. The reason for limiting the amount of conductive pigment powder 13 to the range of 0.01 to 90% by weight is that with an amount of less than 0.01% by weight, adhesion to the transparent substrate (face panel) 12 and film strength deteriorate to fail to coat the transparent conductive film 11 having low surface resistivity by burning at a relative low temperature, while with an amount of over 90% by weight, the solvent necessary for dispersing the conductive pigment powder is insufficient. The solvent is not limited as long as the conductive power can be dispersed, and a solvent including one or both of an organic solvent and water can be used. Examples of the organic solvent which can be used include alcohols such as methanol, ethanol, isopropanol, butanol, hexanol, and the like; ketones such as acetone, methyl ethyl ketone, methyl isobutyl ketone, cyclohexane, isophorone, 4-hydroxy-4-methyl-2-pentanone, and the like; hydrocarbons such as toluene, xylene, hexane, cyclohexane, and the like; amides such as N,N-dimethylformaldehyde, N,N-dimethylacetamide; sulfoxides such as dimethylsulfoxide, and the like.

A preferred solvent is an alcoholic solvent containing alcohol. Namely, the preferred solvent is a solvent including at least one of the above-described alcohols, or an alcohol-containing mixed solvent obtained by mixing at least one alcohol and at least one organic solvent (the above ketone solvent) or further mixing water. The solvent, particularly the alcoholic solvent, preferably contains at least one 2-alkoxyethanol. Examples of 2-alkoxyethanol include 2-(methoxyethoxy) ethanol, 2-ethoxyethanol, 2-(n-, iso-) propoxyethanol, 2-(n-, iso-, tert-) butoxyethanol, and the like.

Examples of the coating method include a spin coating method, a spray method, a dipping method, a bar coating method, a roll coating method, a flow coating method, and the like. However, the spin coating method is preferred because a uniform thin film of 80 to 110 nm can easily be formed. Then, a coating material including silica sol is coated on the surface of the first layer 21 by the same spin coating method as the above to deposit a film, and then dried by maintaining at 5 to 80° C. in the air for 1 minute to 1 hour to form the second layer 22. The transparent substrate 12 on which the first layer 21 and the second layer 22 are formed is further burned to form the transparent conductive film 11 on the transparent substrate 12. The burning temperature of the deposited film is preferably 70 to 500° C., more preferably 70 to 250° C. The reason for limiting the burning temperature of the deposited film to the range of 70 to 500° C. is that with a temperature of less than 70° C., conductivity deteriorates, while with a temperature of over 500° C., the cathode ray tube deteriorates. Burning at 150 to 250° C. permits the complete sphere system production of the cathode ray tube. The burning atmosphere of the deposited film preferably includes nitrogen, the air, alcohol, or the like.

The thus-formed transparent conductive film 11 exhibits high adhesion to the transparent substrate 12 and high film strength, and the surface resistivity can be decreased by burning at a relatively low temperature, and can be prevented from changing with time.

EXAMPLES

Having generally described this invention, a further understanding can be obtained by reference to certain specific examples which are provided herein for purposes of illustration only and are not intended to be limiting unless otherwise specified.

Example 1

590.0 g of $InCl_3$ aqueous solution (containing 217.00 g In), 3.157 g of $SnCl_4$ aqueous solution (containing 1.187 g Sn), and 100.0 g of $HAuCl_4$ aqueous solution (containing 19.697 g Au) were first mixed. The amounts of Sn and Au were 0.5 mole % and 5.0 mole %, respectively, based on the total mole number of In, Sn and Au. Next, the resultant mixed aqueous solution at a temperature of 25° C. was added dropwise to 1 little of 6.25% $NH_3$aq at a temperature of 25° C. so that the final pH was 9, followed by coprecipitation reaction for 40 minutes. Then, the precipitates were repeatedly washed by decantation of ion-exchange water. Next, coprecipitated hydroxides of In, Sn and Au were filtered off when the electric conductivity of the supernatant was 0.5 mS/cm or less. Furthermore, the unburned coprecipitated hydroxide cake was burned at 600° C. in nitrogen gas containing 0.05% of hydrogen gas for 2 hours, and then agglomerated particles were disintegrated by grinding to obtain a conductive pigment powder. The thus-obtained conductive pigment powder was regarded as Example 1.

Example 2

A conductive pigment powder was obtained by the same method as Example 1 except that an $InCl_3$ aqueous solution, an $SnCl_4$ aqueous solution and an $HAuCl_4$ aqueous solution were mixed so that the amounts of Sn and Au were 4.4 mole % and 1.0 mole %, respectively, based on the total mole number of In, Sn and Au, and the coprecipitated hydroxides were dried and then burned at 700° C. in the air for 2 hours. The thus-obtained conductive pigment powder was regarded as Example 2.

Example 3

A conductive pigment powder was obtained by the same method as Example 1 except that an $InCl_3$ aqueous solution, an $SnCl_4$ aqueous solution and an $HAuCl_4$ aqueous solution were mixed so that the amounts of Sn and Au were 4.4 mole % and 0.5 mole %, respectively, based on the total mole number of In, Sn and Au, and the coprecipitated hydroxides were dried and then burned at 700° C. in the air for 2 hours. The thus-obtained conductive pigment powder was regarded as Example 3.

Example 4

596.0 g of $InCl_3$ aqueous solution (containing 219.077 g In), 27.780 g of $SnCl_4$ aqueous solution (containing 10.445 g Sn), and 4.000 g of $HAuCl_4$ aqueous solution (containing 0.788 g Au) were first mixed. The amounts of Sn and Au were 4.4 mole % and 0.2 mole %, respectively, based on the total mole number of In, Sn and Au. Next, the resultant mixed aqueous solution at a temperature of 25° C. and 25% $NH_3$aq at a temperature of 25° C. were added dropwise to 1 little of ion-exchange water at a temperature of 25° C. under stirring so that the final pH was 9, followed by coprecipitation reaction for 40 minutes. Then, the precipitates were repeatedly washed by decantation of ion-exchange water. Next, coprecipitated hydroxides of In, Sn and Au were filtered off when the electric conductivity of the supernatant was 0.5 mS/cm or less. Furthermore, the coprecipitated hydroxides were dried at 100° C. for 15 hours, and burned at 350° C. in nitrogen gas containing 0.05% of carbon monoxide gas for 1 hour, and then agglomerated particles were disintegrated by grinding to obtain a conductive pigment powder. The thus-obtained conductive pigment powder was regarded as Example 4.

Example 5

A conductive pigment powder was obtained by the same method as Example 4 except that an $InCl_3$ aqueous solution, an SnCl$_4$ aqueous solution and an HAuCl$_4$ aqueous solution were mixed so that the amounts of Sn and Au were 2.5 mole % and 0.02 mole %, respectively, based on the total mole number of In, Sn and Au. and the coprecipitated hydroxides were dried and then burned at 700° C. in the air for 3 hours and then 300° C. in an atmosphere including ethanol gas and nitrogen gas for 1 hour. The thus-obtained conductive pigment powder was regarded as Example 5.

Example 6

574.0 g of InCl$_3$ aqueous solution (containing 211.269 g In) and 47.35 g of SnCl$_4$ aqueous solution (containing 17.804 g Sn) were mixed, and the resultant mixed aqueous solution at a temperature of 25 ° C. was added dropwise to 1 little of 6.25% NH$_3$aq at a temperature of 65° C. so that the final pH was 9, followed by coprecipitation reaction for 30 minutes. Then, the precipitates were repeatedly washed by decantation of ion-exchange water. Next, coprecipitated hydroxides of In and Sn were filtered off when the electric conductivity of the supernatant was 0.5 mS/cm or less. Then, 10.000 g of HAuCl$_4$ aqueous solution (containing 1.970 g Au) was added to the resultant coprecipitated hydroxide slurry, and mixed by Disper stirring to obtain coprecipitated hydroxides of In, Sn and Au. The amounts of Sn and Au were 7.5 mole % and 0.5 mole %, respectively, based on the total mole number of In, Sn and Au. Next, Furthermore, the coprecipitated hydroxides were dried at 150° C. for 24 hours, and then burned at 1100° C. in a mixed gas atmosphere containing ethanol gas and nitrogen gas for 1 hour, and then agglomerated particles were disintegrated by grinding to obtain a conductive pigment powder. The thus-obtained conductive pigment powder was regarded as Example 6.

Example 7

A conductive pigment powder was obtained by the same method as Example 6 except that coprecipitated hydroxides were produced so that the amounts of Sn and Au were 15 mole % and 1.0 mole %, respectively, based on the total mole number of In, Sn and Au, dried, and then burned at 700° C. in the air for 1 hour. The thus-obtained conductive pigment powder was regarded as Example 7.

Example 8

A conductive pigment powder was obtained by the same method as Example 1 except that an InCl$_3$ aqueous solution, an SnCl$_4$ aqueous solution and an HAuCl$_4$ aqueous solution were mixed so that the amounts of Sn and Au were 4.4 mole % and 4.4 mole %, respectively, based on the total mole number of In, Sn and Au, and the coprecipitated hydroxides were dried and then burned at 450° C. in nitrogen gas containing 0.025% of ammonia gas for 1 hour. The thus-obtained conductive pigment powder was regarded as Example 8.

Example 9

(a) Formation of Conductive Pigment Powder 590 ml of InCl$_3$ aqueous solution (containing 217.00 g In), 3.157 ml of SnCl$_4$ aqueous solution (containing 1.187 g Sn), and 100 g of HAuCl$_4$ aqueous solution (containing 19.697 g Au) were first mixed. The amounts of Sn and Au were 0.5 mole % and 5.00 mole %, respectively, based on the total mole number of In, Sn and Au. Next, the resultant mixed aqueous solution was added dropwise to 6.25% NH$_3$aq (liquid temperature of 35° C.) so that the final pH was 9, followed by coprecipitation reaction for 40 minutes. Then, the precipitates were repeatedly washed by decantation of ion-exchange water. Next, coprecipitated hydroxides of In, Sn and Au were filtered off when the electric conductivity of the supernatant was 0.5 mS/cm or less. Furthermore, the coprecipitated hydroxides were dried at 150° C. for 24 hours, and burned at 600° C. in a nitrogen atmosphere for 2 hours, and then agglomerated particles were disintegrated by grinding to obtain a conductive pigment powder.

(b) Formation of Transparent Conductive Film

A mixed organic solvent including 5 parts of methanol, 80 parts of ethanol, 10 parts of methyl cellosolve, and 5 parts of diacetone alcohol was prepared, and ITO powder as the conductive pigment powder was mixed with the mixed organic solvent, followed by dispersion with ultrasonic waves for 10 minutes to prepare a dispersion solution. The dispersion solution contained 3.0% by weight of the ITO powder, the balance including the mixed organic solvent. The dispersion solution was coated on the transparent substrate 12 by the spin coating method to deposit a film, and then dried by maintaining at 40° C. in the air for 1 hour to form the first layer 2, as shown in FIG. 1. Next, a coating material SC-100 (produced by Mitsubishi Materials Corporation) containing 1.0% of SiO$_2$ was coated on the surface of the first layer 21 by the spin coating method to deposit a film, and then dried by maintaining at 45° C. in the air for 1 hour to form the second layer 22. Furthermore, the transparent substrate 12 on which the first layer 21 and the second layer 22 were formed was burned at 180° C. in the air to form the transparent conductive film 11 on the transparent substrate 12. The conductive pigment powder 13 and the transparent conductive film 11 were regarded as Example 9.

Example 10

A transparent conductive film was formed by the same method as Example 9 except that an InCl$_3$ aqueous solution, an SnCl$_4$ aqueous solution and an HAuC$_4$ aqueous solution were mixed so that the amounts of Sn and Au were 4.4 mole % and 1.00 mole %, respectively, based on the total mole number of In, Sn and Au, and the coprecipitated hydroxides were dried and then burned at 700° C. in the air for 2 hours to form a conductive pigment powder, and a deposited film was burned at 200° C. in the air. The thus-obtained conductive pigment powder and transparent conductive film were regarded as Example 10.

Example 11

A transparent conductive film was formed by the same method as Example 9 except that an InCl$_3$ aqueous solution, an SnCl$_4$ aqueous solution and an HAuCl$_4$ aqueous solution were mixed so that the amounts of Sn and Au were 4.4 mole % and 0.50 mole %, respectively, based on the total mole number of In, Sn and Au, and the coprecipitated hydroxides were dried and then burned at 750° C. in the air for 2 hours to form a conductive pigment powder, and a deposited film was burned at 220° C. in the air. The transparent conductive film formed on the transparent substrate was regarded as Example 11.

Example 12

A transparent conductive film was formed by the same method as Example 9 was repeated except that an InCl$_3$ aqueous solution, an SnCl$_4$ aqueous solution and an HAuCl$_4$ aqueous solution were mixed so that the amounts of Sn and Au were 2.5 mole % and 0.02 mole % respectively, based on the total mole number of In, Sn and Au, and the coprecipitated hydroxides were dried and then burned at 750° C. in a nitrogen atmosphere for 3 hours to form a conductive pigment powder, and a deposited film was burned at 250° C. in the air. The thus-obtained conductive pigment powder and transparent conductive film were regarded as Example 12.

Example 13

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 15 mole % and 1.00 mole %, respectively, based on the total mole number of In, Sn and Au, and the coprecipitated hydroxides were dried and then burned at 750° C. in a nitrogen atmosphere for 3 hours to form a conductive pigment powder, and a deposited film was burned at 150° C. in a nitrogen atmosphere. The thus-obtained conductive pigment powder and transparent conductive film were regarded as Example 13.

Example 14

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 4.4 mole % and 0.50 mole %, respectively, based on the total mole number of In, Sn and Au, and the coprecipitated hydroxides were dried and then burned at 400° C. in a nitrogen atmosphere for 2 hours to form a conductive pigment powder, and a deposited film was burned at 500° C. in the air. The transparent conductive film formed on the transparent substrate was regarded as Example 14.

Example 15

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 1.0 mole % and 0.50 mole %, respectively, based on the total mole number of In, Sn and Au, and the coprecipitated hydroxides were dried and then burned at 1100° C. in the air for 3 hours to form a conductive pigment powder, and a deposited film was burned at 220° C. in the air. The thus-obtained conductive pigment powder and transparent conductive film were regarded as Example 15.

Example 16

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 0.5 mole % and 0.02 mole %, respectively, based on the total mole number of In, Sn and Au, and the coprecipitated hydroxides were dried and then burned at 750° C. in the air for 2 hours to form a conductive pigment powder, and a deposited film was burned at 180° C. in the air. The thus-obtained conductive pigment powder and transparent conductive film were regarded as Example 16.

Comparative Example 1

618.0 g of $InCl_3$ aqueous solution (containing 227.344 g In) and 20.000 g of $HAuCl_4$ aqueous solution (containing 3.939 g Au) were first mixed. The amount of Au was 1.0 mole % based on the total mole number of In and Au. Next, the resultant mixed aqueous solution at a temperature of 25° C. and 25% $NH_3$aq at a temperature of 25° C. were added dropwise to a 1 little of ion-exchange water at a temperature of 25 ° C. under stirring so that the final pH was 9, followed by coprecipitation reaction for 40 minutes. Then, the precipitates were repeatedly washed by decantation of ion-exchange water. Next, coprecipitated hydroxides of In and Au were filtered off when the electric conductivity of the supernatant was 0.5 mS/cm or less. Furthermore, the coprecipitated hydroxides were dried at 100° C. for 15 hours, and then burned at 700° C. in the air for 2 hours, and then agglomerated particles were disintegrated by grinding to obtain a conductive pigment powder. The thus-obtained conductive pigment powder was regarded as Comparative Example 1.

Comparative Example 2

A conductive pigment powder was obtained by the same method as Example 1 except that an $InCl_3$ aqueous solution, an $SnCl_4$ aqueous solution and an $HAuCl_{14}$, aqueous solution were mixed so that the amounts of Sn and Au were 17 mole % and 1.0 mole %, respectively, based on the total mole number of In, Sn and Au, and coprecipitated hydroxides were dried and then burned at 700° C. in the air for 3 hours. The thus-obtained conductive pigment powder was regarded as Comparative Example 2.

Comparative Example 3

A conductive pigment powder was obtained by the same method as Example 4 except that an $InCl_3$ aqueous solution, an $SnCl_4$ aqueous solution and an $HAuCl_4$ aqueous solution were mixed so that the amounts of Sn and Au were 0.2 mole % and 6.0 mole %, respectively, based on the total mole number of In, Sn and Au, and coprecipitated hydroxides were dried and then burned at 700° C. in the air for 2 hours. The thus-obtained conductive pigment powder was regarded as Comparative Example 3.

Comparative Example 4

597.0 g of $InCl_3$ aqueous solution (containing 219.536 g In) and 27.780 g of $SnCl_4$ aqueous solution (containing 10.445 g Sn) were first mixed. The amount of Sn was 4.4 mole % based on the total mole number of In and Sn. Next, the resultant mixed aqueous solution at a temperature of 25° C. and 25% $NH_3$aq at a temperature of 25° C. were added dropwise to a 1 little of ion-exchange water at a temperature of 25° C. under stirring so that the final pH was 9, followed by coprecipitation reaction for 40 minutes. Then, the precipitates were repeatedly washed by decantation of ion-exchange water. Next, coprecipitated hydroxides of In and Sn were filtered off when the electric conductivity of the supernatant was 0.5 mS/cm or less. Furthermore, the coprecipitated hydroxides were dried at 150° C. for 24 hours, and then burned at 700° C. in the air for 1 hour, and then agglomerated particles were disintegrated by grinding to obtain a conductive pigment powder. The thus-obtained conductive pigment powder was regarded as Comparative Example 4.

Comparative Example 5

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 0.0 mole % and 1.00 mole %, respectively, based on the total mole number of In, Sn and Au, and the coprecipitated hydroxides were dried and then burned at 650° C. in the air for 3 hours to form a conductive pigment powder, and a deposited film was burned at 240° C. in a nitrogen atmosphere. The thus-obtained conductive pigment powder and transparent conductive film were regarded as Comparative Example 5.

Comparative Example 6

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 17.0 mole % and 1.0 mole %, respectively, based on the total mole number of In, Sn and Au, and the coprecipitated hydroxides were dried and then burned at 750° C. in a nitrogen atmosphere for 2 hours to form a conductive pigment powder, and a deposited film was burned at 180° C. in the air. The thus-obtained conductive pigment powder and transparent conductive film were regarded as Comparative Example 6.

Comparative Example 7

A transparent conductive film was formed by the same method as Example 9 was repeated except that an $InC_3$ aqueous solution, an $SnCl_4$ aqueous solution and an $HAuCl_4$ aqueous solution were mixed so that the amounts of Sn and Au were 0.2 mole % and 6.00 mole %, respectively, based on the total mole number of In, Sn and Au, and the coprecipitated hydroxides were dried and then burned at 800° C. in a nitrogen atmosphere for 2 hours to form a conductive pigment powder, and a deposited film was burned at 180° C. in a nitrogen atmosphere. The thus-obtained conductive pigment powder and transparent conductive film were regarded as Comparative Example 7.

Comparative Example 8

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 4.4 mole % and 0.00 mole %, respectively, based on the total mole number of In, Sn and Au, and the coprecipitated hydroxides were dried and then burned at 750° C. in the air for 3 hours to form a conductive pigment powder, and a deposited film was burned at 200° C. in the air. The thus-obtained conductive pigment powder and transparent conductive film were regarded as Comparative Example 8.

Comparative Example 9

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 4.4 mole % and 0.50 mole %, respectively, based on the total mole number of In, Sn and Au, and the coprecipitated hydroxides were dried and then burned at 700° C. in the air for 2 hours to form a conductive pigment powder, and a deposited film was burned at 40° C. in the air. The thus-obtained conductive pigment powder and transparent conductive film were regarded as Comparative Example 9.

Comparative Example 10

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 4.4 mole % and 1.00 mole %, respectively, based on the total mole number of In, Sn and Au, and the coprecipitated hydroxides were dried and then burned at 650° C. in the air for 2 hours to form a conductive pigment powder, and a deposited film was burned at 220° C. in a nitrogen atmosphere. The thus-obtained conductive pigment powder and transparent conductive film were regarded as Comparative Example 10.

Comparative Example 11

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 4.4 mole % and 1.00 mole %, respectively, based on the total mole number of In, Sn and Au, and the coprecipitated hydroxides were dried and then burned at 700° C. in the air for 1 hour to form a conductive pigment powder, and a deposited film was burned at 220° C. in a nitrogen atmosphere. The thus-obtained conductive pigment powder and transparent conductive film were regarded as Comparative Example 11.

Comparative Example 12

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 4.0 mole % and 3.00 mole %, respectively, based on the total mole number of In, Sn and Au, and the coprecipitated hydroxides were dried and then burned at 800° C. in the air for 1 hour to form a conductive pigment powder, and a deposited film was burned at 200° C. in the air. The thus-obtained conductive pigment powder and transparent conductive film were regarded as Comparative Example 12.

Comparative Example 13

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 4.0 mole % and 3.00 mole %, respectively, based on the total mole number of In, Sn and Au, and the coprecipitated hydroxides were dried and then burned at 700° C. in the air for 2 hours to form a conductive pigment powder, and a deposited film was burned at 200° C. in a nitrogen atmosphere. The thus-obtained conductive pigment powder and transparent conductive film were regarded as Comparative Example 13.

Comparative Example 14

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 4.0 mole % and 1.00 mole %, respectively, based on the total mole number of In, Sn and Au, and the coprecipitated hydroxides were dried and then burned at 500° C. in a nitrogen atmosphere for 3 hours to form a conductive pigment powder, and a deposited film was burned at 220° C. in the air. The thus-obtained conductive pigment powder and transparent conductive film were regarded as Comparative Example 14.

Also the lightness index L* valve and the chromaticness index a* value and b* value of the conductive pigment powder of each of Examples 1 to 8 and Comparative Examples 1 to 4 were measured. The results are shown in Table 1.

TABLE 1

| Example No. | Sn (mol %) | AU (mol %) | Average primary particle diameter (μm) | Volume resistivity (Ω · cm) | Lightness index L* value | Chromaticness Index a* value | b* value |
|---|---|---|---|---|---|---|---|
| 1 | 0.5 | 5.0 | 0.025 | 2 | 26.91 | 8.11 | −5.08 |
| 2 | 4.4 | 1.0 | 0.030 | 0.05 | 43.18 | 13.04 | −5.28 |
| 3 | 4.4 | 0.5 | 0.028 | 0.02 | 46.56 | 8.67 | −7.12 |
| 4 | 4.4 | 0.2 | 0.008 | 0.03 | 48.50 | 15.34 | −9.88 |
| 5 | 2.5 | 0.02 | 0.032 | 0.5 | 60.72 | 14.40 | −5.01 |
| 6 | 7.5 | 0.5 | 0.25 | 5 | 84.79 | 39.51 | −30.12 |
| 7 | 15 | 1.0 | 0.42 | 19 | 26.11 | 7.31 | −2.21 |
| 8 | 4.4 | 4.4 | 0.030 | 3 | 25.19 | 5.01 | −1.10 |
| 1* | 0 | 1.0 | 0.030 | $6 \times 10^6$ | 83.35 | 12.67 | −7.71 |
| 2* | 17 | 1.0 | 0.023 | 81 | 22.51 | 17.33 | −6.67 |
| 3* | 0.2 | 6.0 | 0.051 | $3 \times 10^4$ | 23.17 | 3.99 | −1.21 |
| 4* | 4.4 | 0 | 0.027 | 5 | 75.42 | −4.88 | 23.11 |

Example Nos. 1* to 4*: Comparative Examples.

Comparative Example 15

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 2.5 mole % and 0.02 mole %, respectively, based on the total mole number of In, Sn and Au, and the coprecipitated hydroxides were dried and then burned at 1200° C. in a nitrogen atmosphere for 2 hours to form a conductive pigment powder, and a deposited film was burned at 250° C. in the air. The thus-obtained conductive pigment powder and transparent conductive film were regarded as Comparative Example 15.

Comparative Example 16

A transparent conductive film was formed by the same method as Example 9 was repeated except that an $InCl_3$ aqueous solution, an $SnCl_4$ aqueous solution and an $HAuCl_4$ aqueous solution were mixed so that the amounts of Sn and Au were 0.0 mole % and 1.00 mole %, respectively, based on the total mole number of In, Sn and Au, and the coprecipitated hydroxides were dried and then burned at 700° C. in the air for 1 hour to form a conductive pigment powder, and a deposited film was burned at 200° C. in the air. The thus-obtained conductive pigment powder and transparent conductive film were regarded as Comparative Example 16.

Comparison Test 1 and Evaluation

The average primary particle diameter and the volume resistivity of the conductive pigment powder of each of Examples 1 to 8 and Comparative Examples 1 to 4 were measured. The results are shown in Table 1.

The average primary particle diameter of each pigment powder was measured by observing on a transmission electron microscope (TEM). The volume resistivity of each pigment powder was measured by the four-probe method using a green compact formed by pressing the pigment powder under a pressure of 5-MPa.

Table 1 indicates that Comparative Examples 1 and 3 show a volume resistivity of over 100 Ω·cm, Comparative Examples 2 and 3 show a lightness index L* value of less than 25, and Comparative Example 4 shows a minus chromaticness index a* value (green direction) and a plus b* value (yellow direction). All comparative examples do not have a color tone as a purple pigment. On the other hand, Examples 1 to 8 have a purple color tone, a volume resistivity in the range of 0.01 to 100 Ω·cm, and good conductivity.

Comparison Test 2 and Evaluation

The contents of Sn and Au of the conductive pigment powder, and the burning temperature of the deposited film of each of Examples 9 to 16 and Comparative Examples 5 to 16 are shown in Table 2.

Also the average primary particle diameter and the volume resistivity of the conductive pigment powder of each of Examples 9 to 16 and Comparative Examples 5 to 16 were measured. The results are shown in Table 3.

The average primary particle diameter of each conductive pigment powder was measured by observing on an optical microscope. The volume resistivity of each pigment powder was measured by the four-probe method using a green compact formed by pressing the pigment powder under a pressure of 5-MPa.

The surface resistivity, reflectance, hardness and visible light transmittance of the transparent conductive film of each of Examples 9 to 16 and Comparative Examples 5 to 16 were measured. The results are shown in Table 3.

The surface resistivity of each transparent conductive film was measured immediately after film deposition and 30 days after film deposition.

In order to measure the reflectance of each transparent conductive film, a black vinyl tape (No. 21: produced by Nitto Denko Corporation) was put on the back side of a glass sample, and then maintained at 50° C. for 30 minutes to form a black mask, and then the visible light minimum reflectance due to 12° C. regular reflection was measured by a self spectrophotometer (U-4000 model: produced by Hitachi, Ltd.). The visible light minimum reflectance represents reflectance with the bottom at 500 to 600 nm having high visibility.

Furthermore, the hardness of the transparent conductive film was measured by deciding as to whether the transparent conductive film was scratched with a 1H to 9H pencil.

TABLE 2

| Example No. | Sn (mol %) | Au (mol %) | Burning temperature of deposited film (° C.) |
|---|---|---|---|
| Example 9 | 0.5 | 5.00 | 180 |
| Example 10 | 4.4 | 1.00 | 200 |
| Example 11 | 4.4 | 0.50 | 220 |
| Example 12 | 2.5 | 0.02 | 250 |
| Example 13 | 15.0 | 1.00 | 70 |
| Example 14 | 4.4 | 0.50 | 500 |
| Example 15 | 1.0 | 0.50 | 220 |
| Example 16 | 0.5 | 0.02 | 180 |
| Comp. Example 5 | 0.0 | 1.00 | 240 |
| Comp. Example 6 | 17.0 | 1.00 | 180 |
| Comp. Example 7 | 0.2 | 6.00 | 280 |
| Comp. Example 8 | 4.4 | 0.00 | 200 |
| Comp. Example 9 | 4.4 | 0.50 | 40 |
| Comp. Example 10 | 4.4 | 1.00 | 220 |
| Comp. Example 11 | 4.4 | 1.00 | 220 |
| Comp. Example 12 | 4.0 | 3.00 | 200 |
| Comp. Example 13 | 4.0 | 3.00 | 200 |
| Comp. Example 14 | 4.0 | 1.00 | 220 |
| Comp. Example 15 | 2.5 | 0.02 | 250 |
| Comp. Example 16 | 0.0 | 1.00 | 220 | of the transparent conductive films of Comparative Examples are substantially the same values as Examples.

With respect to film deposition property of the transparent conductive film on the transparent substrate, all Examples 9 to 16 and Comparative Examples 5 to 16 show good property without causing interference nonuniformity.

As described above, the present invention provides a conductive pigment powder including indium oxide containing at least tin and gold, and thus a purple color tone and improved color tone.

In a case where the contents of tin and gold are 0.5 to 15 mole % and 0.02 to 5 mole % respectively, based on the total mole number of indium, tin and gold, the resistance value is decreased to increase conductivity.

Also in a case where the lightness index L* value in the CIE 1976 L*a*b* color space (measurement light source C: color temperature 6774 K) is 25 to 85, and the chromaticness index a* value and b* value are +1.0 to +40.0 and −1.0 to −40.0, respectively, the conductive pigment powder has a purple color tone.

In a case where the volume resistivity measured by the four-probe method using a 5-MPa green compact is 0.001 to 100 Ω·cm, a conductive film can be formed by mixing with a solvent and ink.

With an average primary particle diameter in the range of 0.005 to 0.5 μm, a transparent conductive film having excellent visibility can be formed.

In addition, a mixed aqueous solution including an indium salt, a tin salt, and a gold salt and an alkaline aqueous

TABLE 3

| Example No. | Average primary particle diameter (μm) | Volume resistivity (Ω·cm) | Thickness (nm) | | | Surface Resistivity (× 10$^3$Ω/) | | Reflectance (%) | Hardness | Visible light transmittance |
|---|---|---|---|---|---|---|---|---|---|---|
| | | | First layer | Second layer | Third layer | Immediately after deposition | 30 days after deposition | | | |
| 9 | 0.025 | 2 | 105 | 85 | — | 3.6 | 3.8 | 0.6 | 9H | 98.1 |
| 10 | 0.030 | 0.05 | 90 | 100 | — | 2.4 | 2.5 | 0.6 | 9H | 98.5 |
| 11 | 0.028 | 0.02 | 80 | 95 | — | 2.1 | 2.2 | 0.6 | 9H | 98.7 |
| 12 | 0.032 | 0.5 | 110 | 80 | 15 | 1.6 | 1.6 | 0.6 | 9H | 99.3 |
| 13 | 0.420 | 19 | 95 | 110 | — | 4.9 | 5.1 | 0.7 | 9H | 98.0 |
| 14 | 0.028 | 0.05 | 90 | 80 | — | 1.2 | 1.4 | 0.8 | 9H | 98.6 |
| 15 | 0.480 | 3.6 | 95 | 95 | — | 5.5 | 5.6 | 0.9 | 9H | 98.2 |
| 16 | 0.062 | 98 | 90 | 105 | — | 7.2 | 7.3 | 0.6 | 9H | 98.7 |
| 5* | 0.030 | 0.006 | 100 | 105 | — | 47.8 | 90.1 | 0.6 | 9H | 99.5 |
| 6* | 0.023 | 81 | 95 | 100 | — | 8.4 | 15.2 | 1.0 | 9H | 98.4 |
| 7* | 0.051 | 0.0003 | 105 | 110 | — | 30.4 | 72.3 | 1.0 | 9H | 98.2 |
| 8* | 0.027 | 5 | 100 | 95 | — | 9.7 | 14.7 | 0.8 | 9H | 98.9 |
| 9* | 0.028 | 0.02 | 105 | 90 | — | 62 | 117 | 1.5 | 7H | 98.0 |
| 10* | 0.030 | 0.05 | 30 | 85 | — | 11.4 | 187 | 6.4 | 8H | 99.2 |
| 11* | 0.030 | 0.05 | 205 | 100 | — | 8.4 | 14.2 | 8.8 | 8H | 98.1 |
| 12* | 0.049 | 2 | 95 | 35 | — | 21 | 32 | 11.0 | 3H | 98.5 |
| 13* | 0.049 | 2 | 100 | 210 | — | 12 | 385 | 9.8 | 8H | 98.0 |
| 14* | 0.030 | 0.05 | 105 | 105 | 50 | 11.2 | 17.5 | 0.4 | 7H | 94.9 |
| 15* | 0.950 | 0.28 | 105 | 90 | — | 14.8 | 25.5 | 3.2 | 7H | 90.4 |
| 16* | 0.036 | 156 | 100 | 100 | — | 562 | 2.9 | 2.9 | 8H | 96.8 |

Example Nos. 5* to 16*: Comparative Examples.

Table 3 indicates that immediately after film deposition, Comparative Examples 5 to 16 show a surface resistivity of as high as 8.4×10$^3$ to 562×10$^3$Ω, while Examples 9 to 16 show a low surface resistivity of 1.2×10$^3$ to 7.2×Ω. Also 30 days after film deposition, the surface resistivity of Comparative Examples 5 to 16 decreases to 5 to 474Ω, while the surface resistivity of Examples 9 to 16 less deteriorates.

On the other hand, the average primary particle diameter, the volume resistivity of the conductive pigment powder, and the reflectance, hardness and visible light transmittance solution are subjected to coprecipitation reaction to produce hydroxides, and the hydroxides are heated to obtain a conductive pigment powder having a purple color tone. Therefore, the color tone is improved, and conductive is increased, thereby permitting the formation of a conductive film by mixing with a coating material and ink, or the formation of a transparent conductive film having excellent visibility.

By dispersing 0.01 to 90% by weight of the conductive pigment powder in a solvent including one or both of an organic solvent and water to produce a dispersion solution, the dispersion solution can be uniformly coated on a transparent substrate, and then burned to obtain a transparent conductive film having high adhesion to the transparent substrate and high film strength.

The transparent conductive film formed on the transparent substrate and containing the conductive pigment powder permits the surface resistivity to be decreased by burning at a relatively low temperature, and the prevention of a change in surface resistivity with time.

By using an organic polymer as a film matrix, a transparent conductive film having flexibility can be obtained by forming on a base material such as a film or the like.

With the film matrix containing at least a siloxane skeleton, hardness, strength, weather resistance (heat resistance, moisture resistance, chemical resistance, etc.) can be improved.

With the conductive pigment powder including indium oxide containing 0.5 to 15 mole % of tin and 0.02 to 5.00 mole % of gold based on the total mole number of indium, tin and gold, the resistance value is decreased to increase conductivity.

With the conductive pigment powder having an average primary particle diameter of 0.005 to 0.5 μm, a transparent conductive film having excellent visibility can be formed.

With the conductive pigment powder having a volume resistivity of 0.001 to 100 Ω·cm measured by the four-probe method using a 5-MPa green compact, the conductivity of the transparent conductive film is increased to prevent the occurrence of a leakage electric field.

By providing a first layer filled with indium oxide particles containing tin and gold, and a second layer formed by silica sol on the first layer, or further providing a third layer on the second layer, visible light reflectance can be decreased by the second or third layer.

Furthermore, an aqueous solution containing indium ions, an aqueous solution containing tin ions, and an aqueous solution containing gold ions are mixed, and the mixed aqueous solution is reacted with an alkaline aqueous solution to produce coprecipitated hydroxides. The thus-produced coprecipitated hydroxides are heated at 350 to 1100° C. to form a conductive pigment powder. A dispersion solution obtained by mixing the conductive pigment powder with a coating material is coated on a transparent substrate to deposit a film, and the deposited film is burned at a predetermined temperature to form a transparent conductive film. The thus-obtained transparent conductive film exhibits the above-described significant effect.

Furthermore, by forming the transparent conductive film on the outer surface of a transparent substrate, the transparent conductive film exhibits high adhesion to the transparent substrate, high film strength, and low surface resistivity, thereby obtaining a cathode ray tube having an improved color tone, high conductivity and excellent visibility.

Having now fully described this invention, it will be apparent to one of ordinary skill in the art that many changes and modifications can be made thereto without departing from the spirit or scope of the invention as set forth herein.

This application is based on Japanese Patent Applications Hei 11-342782, filed Dec. 2, 1999, 2000-068345, filed Mar. 13, 2000, and 2000-260960, filed Aug. 30, 2000, the entire contents of each of which are hereby incorporated by reference, the same as if set forth at length.

What is claimed is:

1. A method of producing a conductive pigment powder, comprising:

coprecipitating one or more hydroxides by reacting a mixed aqueous solution comprising an indium salt, a tin salt and a gold salt, with an alkaline aqueous solution, to obtain one or more hydroxides; and heating said hydroxides.

2. The method according to claim 1, wherein said heating is carried out at a temperature in the range of 350 to 1100° C.

3. The method according to claim 1, wherein said heating comprises heating said hydroxides in an inert gas atmosphere comprising at least one alcohol gas selected from the group consisting of methanol, ethanol, propanol, butanol, and mixtures thereof.

4. The method according to claim 1, wherein said heating comprises heating said hydroxides in an inert gas atmosphere comprising at least one gas selected from the group consisting of hydrogen, ammonia, carbon monoxide, and mixtures thereof.

5. The method according to claim 1, wherein said powder has an average primary particle diameter in the range of 0.005 to 0.5 μm.

6. A method of forming a transparent conductive film comprising;

mixing an aqueous solution comprising indium ions, an aqueous solution comprising tin ions, and an aqueous solution comprising gold ions, to form a mixture;

reacting said mixture with an alkaline aqueous solution to form at least one coprecipitated hydroxide;

heating said coprecipitated hydroxide at 350 to 1100° C. to form a conductive pigment powder;

mixing said conductive pigment powder with a solvent comprising one or both of an organic solvent and water, to form a dispersion solution;

coating said dispersion solution on a transparent substrate to form a deposited film; and burning said deposited film at a predetermined temperature to form a transparent conductive film.

7. The method according to claim 6, wherein the tin ions are selected from the group consisting of $Sn^{2+}$ ions, $Sn^{4+}$ ions, and combinations thereof.

8. The method according to claim 6, further comprising heat-treating said conductive pigment powder at a temperature ranging from 150 to 450° C. in an atmosphere comprising at least one gas selected from the group consisting of methanol, ethanol, propanol, butanol, and mixtures thereof.

9. The method according to claim 6, wherein said predetermined temperature ranges from 70 to 500° C.

* * * * *